(12) United States Patent
Hsin et al.

(10) Patent No.: US 10,618,265 B2
(45) Date of Patent: Apr. 14, 2020

(54) OPTICAL ASSEMBLY AND THE METHOD TO MAKE THE SAME

(71) Applicant: UBRIGHT OPTRONICS CORPORATION, Taoyuan (TW)

(72) Inventors: Lung-Pin Hsin, Taoyuan (TW); Yi-Long Tyan, Taoyuan (TW)

(73) Assignee: UBRIGHT OPTRONICS CORPORATION, Taoyuan County (TW)

( * ) Notice: Subject to any disclaimer, the term of this patent is extended or adjusted under 35 U.S.C. 154(b) by 0 days.

(21) Appl. No.: 16/038,192

(22) Filed: Jul. 18, 2018

(65) Prior Publication Data

US 2018/0319145 A1 Nov. 8, 2018

Related U.S. Application Data

(63) Continuation-in-part of application No. 15/157,380, filed on May 17, 2016, now Pat. No. 10,114,153.

(Continued)

(51) Int. Cl.
*B32B 37/12* (2006.01)
*B32B 7/12* (2006.01)

(Continued)

(52) U.S. Cl.
CPC ............... *B32B 37/12* (2013.01); *B32B 7/12* (2013.01); *B32B 37/0076* (2013.01); *B32B 38/0036* (2013.01); *B32B 38/164* (2013.01); *C09J 4/00* (2013.01); *C09J 133/14* (2013.01); *C09J 201/00* (2013.01); *G02B 5/045* (2013.01); *B32B 2037/1253* (2013.01); *B32B 2038/168* (2013.01); *B32B 2310/0831* (2013.01); *B32B 2551/00* (2013.01); *G02B 5/0231* (2013.01)

(58) Field of Classification Search
CPC .... G02B 5/0231; G02B 5/0278; G02B 5/045; C09J 135/02; C09J 4/00; C09J 133/14; C09J 201/00; C08L 2312/06; B32B 37/12; B32B 37/0076; B32B 38/0036; B32B 38/164; B32B 2037/1253; B32B 2038/168; B32B 2310/0831; B32B 2551/00; B32B 5/0231
USPC ........................................................ 359/599
See application file for complete search history.

(56) References Cited

U.S. PATENT DOCUMENTS

| | | | | |
|---|---|---|---|---|
| 7,852,435 B2 * | 12/2010 | Fujisawa | ............... | G02B 5/0221 349/112 |
| 7,924,368 B2 * | 4/2011 | Fabick | .................... | B32B 27/08 349/64 |
| 10,175,522 B2 * | 1/2019 | Konuma | ............... | B32B 27/308 |

* cited by examiner

*Primary Examiner* — Collin X Beatty
(74) *Attorney, Agent, or Firm* — Litron Patent & Trademark Office; Min-Lee Teng

(57) ABSTRACT

The present invention discloses an optical assembly. The optical assembly comprises: a first optical film having a first surface; an adhesive disposed on the first surface of the first optical film, wherein the adhesive comprises a photo-curable portion and a thermally-curable portion mixed with the photo-curable portion, wherein the weight ratio of the thermally-curable portion of the adhesive to the adhesive is less than 5%; and a second optical film comprising a photo-curable material, wherein the adhesive is bonded to the second optical film through the bonding between the photo-curable portion of the adhesive and the photo-curable material of the second optical film without relying on the bonding between the thermally-curable portion of the adhesive and the photo-curable material of the second optical film.

7 Claims, 7 Drawing Sheets

Related U.S. Application Data

(60) Provisional application No. 62/310,815, filed on Mar. 21, 2016.

(51) Int. Cl.
*C09J 133/14* (2006.01)
*C09J 201/00* (2006.01)
*B32B 38/00* (2006.01)
*G02B 5/04* (2006.01)
*B32B 37/00* (2006.01)
*C09J 4/00* (2006.01)
*G02B 5/02* (2006.01)
*B32B 38/16* (2006.01)

OPTICAL ASSEMBLY AND THE METHOD TO MAKE THE SAME

CROSS-REFERENCE TO RELATED APPLICATION

This application is a continuation-in-part of U.S. patent application Ser. No. 15/157,380 filed on May 17, 2016, which claims priority of U.S. Provisional Application Ser. No. 62/310,815 filed on Mar. 21, 2016. All of these applications are incorporated by referenced herein in their entirety.

BACKGROUND OF THE INVENTION

1. Field of the Invention

The present invention relates to an optical assembly, and more particularly, to an optical assembly combined by an adhesive.

2. Description of Related Art

FIG. 1A illustrates a schematic cross-sectional view of an adhesive optical assembly 10. The optical assembly 10 includes a bottom light enhancement film 11 and a top light enhancement film 12 disposed over the bottom light enhancement film 11. Conventionally, coat a liquid adhesive layer 13 on the bottom surface of the top light enhancement film 12, insert the prisms of the bottom light enhancement film 11 into the liquid adhesive layer 13 by embossing and subsequently perform a heat treatment process or a UV illumination process on the liquid adhesive layer 13 so that the liquid adhesive layer 13 proceeds to a crosslink reaction to form a solid film to finish the adhesion between the bottom light enhancement film 11 and the top light enhancement film 12. It is advantageous that the adhesive layer 13 in the liquid state guarantees that there is enough contact area between the liquid adhesive layer 13 and the prisms of the bottom light enhancement film 11 to provide the adhesive stability of the optical assembly 10. However, because the adhesive layer 13 is in the liquid phase before adhesion, it is easy to see obvious "wick phenomenon" (i.e. capillarity phenomenon) during adhesion so that it is not easy to control the contact area between the liquid adhesive layer 13 and the prisms of the bottom light enhancement film 11 and further the optical property after adhesion gets worse. The greater the contact area during adhesion is, the worse the optical gain (i.e. brightness) is.

There is also another way to finish adhesion. Coat a liquid adhesive layer 13 on the bottom surface of the top light enhancement film 12, perform the illumination process or the heat treatment process to make the liquid adhesive layer 13 proceed to a crosslink reaction to form a solid film, and then insert the prisms of the bottom light enhancement film 11 into the solid adhesive layer 13 by embossing to finish the adhesion between the bottom light enhancement film 11 and the top light enhancement film 12. It is advantageous that the liquid adhesive layer 13 after solidification do not have flowability so as to reduce "wick phenomenon". However, because the liquid adhesive layer 13 is solidified first, most of the bonding between the prisms of the bottom light enhancement film 11 and the solid adhesive layer 13 is physical bonding, not chemical bonding, and therefore the adhesion force between the bottom light enhancement film 11 and the top light enhancement film 12 is usually weaker so that it is easy to have the peeling of the adhesion product in the subsequent trimming and assembling.

Accordingly, the present invention proposes an optical assembly and its manufacturing method to overcome the above-mentioned disadvantages.

SUMMARY OF THE INVENTION

The present invention provides an optical assembly and a method for manufacturing the optical assembly which can effectively control the contact area of the adhesion to avoid wick phenomenon in the adhesion process and guarantee the enough adhesive strength of the optical assembly.

In one embodiment, the present invention discloses an optical assembly comprising: a first optical film having a first surface; an adhesive disposed on the first surface of the first optical film, wherein the adhesive comprises a photo-curable portion and a thermally-curable portion; and a second optical film comprising a photo-curable material bonded to the photo-curable portion of the adhesive, wherein the photo-curable portion of the adhesive is being bonded to the photo-curable material of the second optical film when the photo-curable portion of the adhesive is being cured and the thermally-curable portion of the adhesive has been cured.

In one embodiment, the present invention discloses a method of forming an optical assembly comprising: providing a first optical film having a first surface; disposing an adhesive on the first surface of the first optical film, wherein the adhesive comprises a photo-curable portion and a thermally-curable portion; and providing a second optical film comprising a photo-curable material bonded to the photo-curable portion of the adhesive, wherein the photo-curable portion of the adhesive is being bonded to the photo-curable material of the second optical film when the photo-curable portion of the adhesive is being cured and the thermally-curable portion of the adhesive has been cured.

In one embodiment, the present invention discloses an optical assembly comprising: a first optical film having a first surface; an adhesive disposed on the first surface of the first optical film, wherein the adhesive comprises a thermally-curable portion and a photo-curable portion; and a second optical film comprising a thermally-curable material bonded to the thermally-curable portion of the adhesive, wherein the thermally-curable portion of the adhesive is being bonded to the thermally-curable material of the second optical film when the thermally-curable portion of the adhesive is being cured and the photo-curable portion of the adhesive has been cured.

In one embodiment, the present invention discloses an optical assembly comprising: a first optical film having a first surface; an adhesive disposed on the first surface of the first optical film, wherein the adhesive comprises a first curable portion and a second curable portion; and a second optical film comprising a curable material bonded to the second curable portion of the adhesive, wherein the first curable portion of the adhesive is cured by a first process, and the second curable portion of the adhesive and the curable material of the second optical film are cured by a second process different from the first process, wherein the second curable portion of the adhesive is being bonded to the curable material of the second optical film when the second curable portion of the adhesive is being cured and the first curable portion of the adhesive has been cured.

The detailed technology and above preferred embodiments implemented for the present invention are described in the following paragraphs accompanying the appended drawings for people skilled in the art to well appreciate the features of the claimed invention.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein.

DETAILED DESCRIPTION OF THE ILLUSTRATED EMBODIMENTS

The detailed explanation of the present invention is described as following. The described preferred embodiments are presented for purposes of illustrations and description and they are not intended to limit the scope of the present invention.

Figure 1:
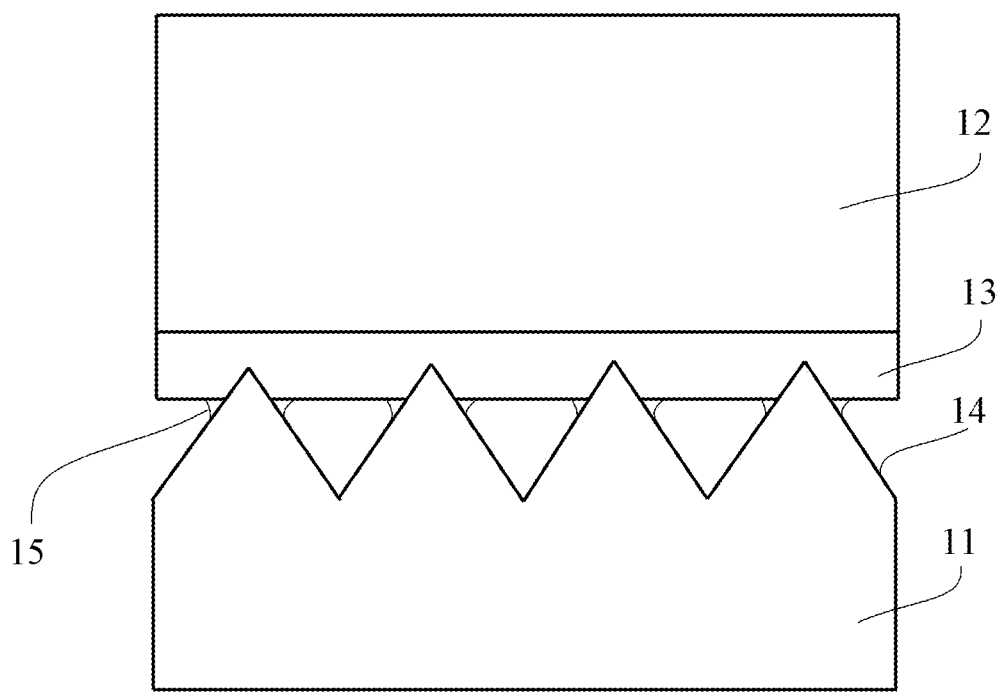
FIG. 1 illustrates a schematic cross-sectional view of an adhesive optical assembly.
Figure 2:
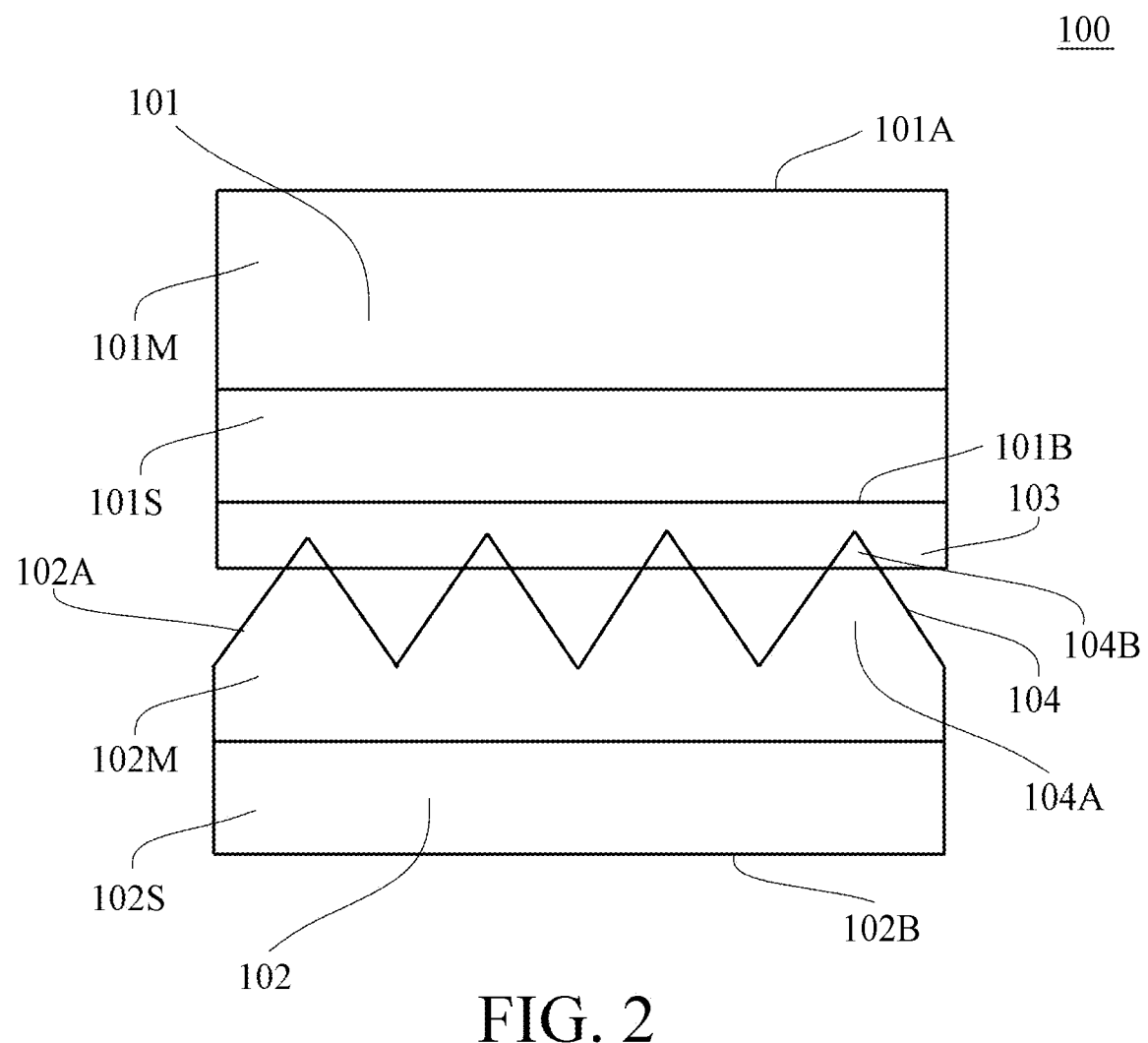
FIG. 2 illustrates a schematic cross-sectional view of an optical assembly in the present invention.

FIG. 2 illustrates a schematic cross-sectional view of an optical assembly 100 in the present invention. The optical assembly 100 comprises a first optical film 101, a second optical film 102 and an adhesive 103 between the first optical film 101 and the second optical film 102. The first optical film 101 has a top surface 101A and a bottom surface 101B. The adhesive 103 is disposed on the bottom surface 101B of the first optical film 101. The second optical film 102 has a top surface 102A and a bottom surface 102B. The adhesive 103 comprises a photo-curable portion and a thermally-curable portion. The second optical film 102 comprises a photo-curable material bonded to the photo-curable portion of the adhesive 103, wherein the photo-curable portion of the adhesive 103 is being bonded to the photo-curable material of the second optical film 102 when the photo-curable portion of the adhesive 103 is being cured and the thermally-curable portion of the adhesive 103 has been cured. The adhesive 103 comprises a photo-curable portion and a thermally-curable portion mixed with the photo-curable portion. When the photo-curable portion of the adhesive 103 is being cured for bonding the photo-curable portion of the adhesive 103 to the photo-curable material of the second optical film 102, and the thermally-curable portion of the adhesive 103 has weak tendency or no tendency for bonding the thermally-curable portion of the adhesive 103 to the photo-curable material of the second optical film 102. Therefore, in the optical assembly 100, the adhesive 103 is bonded to the second optical film 102 through the bonding between the photo-curable portion of the adhesive 103 and the photo-curable material of the second optical film 102 without relying on the bonding between the thermally-curable portion of the adhesive 103 and the photo-curable material of the second optical film 102.

In one embodiment, the second optical film 102 comprise a plurality of microstructures 104 (e.g. prisms or microlens, preferably, each microstructure 104 is a prism), and the microstructures 104 are made of the photo-curable material bonded to the photo-curable portion of the adhesive 103, wherein the photo-curable portion of the adhesive 103 is being bonded to the photo-curable material of the microstructures 104 of the second optical film 102 when the photo-curable portion of the adhesive 103 is being cured and the thermally-curable portion of the adhesive 103 has been cured. Preferably, if wick phenomenon (between the adhesive 103 disposed on the bottom surface 101B of the first optical film 101 and the microstructures 104 of the second optical film 102) results from the combination of the photo-curable portion of the adhesive 103 and the photo-curable material of the microstructures 104 of the second optical film 102, increasing the surface area (the area not embedded in the adhesive 103) of the microstructures 104 of the second optical film 102, reducing the thickness of the adhesive 103 or any other suitable method can improve the optical gain (i.e. brightness) of the optical assembly 100.

The adhesive 103 can be made of a combination of a first material and a second material different from the first material, wherein the first material has the photo-curable function group(s) to serve as the photo-curable portion of the adhesive 103 and the second material has the thermal-curable function group(s) to serve as the thermally-curable portion of the adhesive 103. The adhesive 103 can be also made of a single material having the photo-curable function group(s) and the thermal-curable function group(s) respectively serving as the photo-curable portion of the adhesive 103 and the thermally-curable portion of the adhesive 103.

The specific manufacturing method is described as follows:

In the beginning, dispose the adhesive 103 on the bottom surface 101B of the first optical film 101; at the moment, the adhesive 103 is in the liquid state. If the second optical film 102 is being bonded to the adhesive 103 in the liquid state, the interface between the adhesive 103 in the liquid state and the second optical film 102 is inclined to have wick phenomenon to reduce to the optical gain (i.e. brightness) of the optical assembly 100. In order to solve the above problem, the present invention uses the adhesive 103 comprising two curable portions cured by different processes to improve the adhesive force between the adhesive 103 and the second optical film 102 and the optical gain of the optical assembly 100 at the same time.

The adhesive 103 comprises a photo-curable portion which can be cured by an illumination process and a thermally-curable portion which can be cured by the heat treatment process; however, the present invention is not limited to this case (e.g., the adhesive 103 comprises a first curable portion which can be cured by a first process and a second curable portion which can be cured by a second process). In one embodiment, the weight ratio of the thermally-curable portion of the adhesive 103 to the adhesive 103 is less than 5% (or less than 3%, or less than 1%). After performing the heat treatment process on the adhesive 103 in the liquid phase on the bottom surface 101B of the first optical film 101, the thermally-curable portion of the adhesive 103 is cured but the photo-curable portion of the adhesive 103 is not cured. Therefore, the phase of the adhesive 103 on the bottom surface 101B of the first optical film 101 is changed from the liquid phase to the semi-solid phase after the heat treatment process. Subsequently, bond the second optical film 102 to the adhesive 103 in the semi-solid phase on the bottom surface 101B of the first optical film 101. Because the adhesive 103 in the semi-solid phase has less flowability than the adhesive 103 in the liquid phase, wick phenomenon can be largely improved when the second optical film 102 is being bonded to the adhesive 103 in the semi-solid state. Even if the weight ratio of the thermally-curable portion of the adhesive 103 to the adhesive 103 is less than 5% (or less than 3%, or less than 1%), a minor portion of the adhesive 103 is still cured to decease the flowability of the adhesive 103 and thus wick phenomenon can be also improved when the second optical film 102 is being bonded to the adhesive 103. Besides, whether there is a thermally-curable portion in the adhesive 103 or not, performing the heat treatment process on the adhesive 103 in advance can also remove the solvent in the adhesive 103 (at this time, the adhesive 103 is not in the solid state) to decease the flowability of the adhesive 103 (at this time, the adhesive 103 still has some flowability) and thus wick phenomenon can be also improved when the second optical film 102 is being bonded to the adhesive 103. When bonding the second optical film 102 to the adhesive 103 in the semi-solid phase on the bottom surface 101B of the first optical film 101, an illumination process is performed on the photo-curable portion of the adhesive 103 (uncured) and the photo-curable material of the second optical film 102 (at the moment, the photo-curable material of the second optical film 102 can be not cured or partially cured by controlling the UV illumination energy in the illumination process to make the photo-curable material of the second optical film 102 only finish a portion of the crosslink-curing reaction) to completely finish the chemical bonding. Therefore, the phase of the adhesive 103 between the first optical film 101 and the second optical film 102 is changed from the semi-solid phase to the solid phase and the phase of the photo-curable material of the second optical film 102 is changed to the solid phase after the illumination process.

The advantages of the above manufacturing method comprise: (a) By optimizing the weight ratio of the photo-curable portion and the thermal-curable portion of the adhesive 103, the hardness of the adhesive 103 in the semi-solid state after the heat treatment process can be adjusted to further control the insertion depth in the adhesive 103 of the microstructures 104 of the second optical film 102; meanwhile, because the adhesive 103 in the semi-solid state does not have flowability, wick phenomenon can be effectively improved. Beside, the contact area of the microstructures 104 of the second optical film 102 in the adhesive process can be precisely controlled; (b) In the adhesive process, because the adhesive 103 in the semi-solid state and the microstructures 104 of the second optical film 102 both have the non-reactive photo-curable function group(s), photo-polymerization can be performed to form chemical bonding in the subsequent UV illumination to further provide enough adhesive force between the first optical film 101 and the second optical film 102.

The weight ratio of the photo-curable portion to the thermally-curable portion of the adhesive 103 can be further configured to improve the adhesive force between the adhesive 103 and the microstructures 104 of the second optical film 102 and the optical gain of the optical assembly 100 at the same time. In one embodiment, the weight ratio of the photo-curable portion to the thermally-curable portion of the adhesive 103 is configured such that the adhesive force between the adhesive 103 and the microstructures 104 of the second optical film 102 is greater than 100 g/25 mm and the optical gain of the optical assembly 100 is greater than 1.6. In one embodiment, the weight ratio of the photo-curable portion to the thermally-curable portion of the adhesive 103 is configured such that the adhesive force between the adhesive 103 and the microstructures 104 of the second optical film 102 is greater than 120 g/25 mm and the optical gain of the optical assembly 100 is greater than 1.62. In one embodiment, the weight ratio of the photo-curable portion to the thermally-curable portion of the adhesive 103 is configured such that the adhesive force between the adhesive 103 and the microstructures 104 of the second optical film 102 is greater than 140 g/25 mm and the optical gain of the optical assembly 100 is greater than 1.62. In one embodiment, the weight ratio of the photo-curable portion to the thermally-curable portion of the adhesive 103 is configured such that the adhesive force between the adhesive 103 and the microstructures 104 of the second optical film 102 is greater than 160 g/25 mm and the optical gain of the optical assembly 100 is greater than 1.65. In one embodiment, the weight ratio of the photo-curable portion to the thermally-curable portion of the adhesive 103 is configured such that the adhesive force between the adhesive 103 and the microstructures 104 of the second optical film 102 is greater than 180 g/25 mm and the optical gain of the optical assembly 100 is greater than 1.65. In one embodiment, the weight ratio of the photo-curable portion to the thermally-curable portion of the adhesive 103 is configured such that the adhesive force between the adhesive 103 and the microstructures 104 of the second optical film 102 is greater than 200 g/25 mm and the optical gain of the optical assembly 100 is greater than 1.67. In one embodiment, the weight ratio of the photo-curable portion to the thermally-curable portion of the adhesive 103 is configured such that the adhesive force between the adhesive 103 and the microstructures 104 of the second optical film 102 is greater than 220 g/25 mm and the optical gain of the optical assembly 100 is greater than 1.67. In one embodiment, the weight ratio of the photo-curable portion to the thermally-curable portion of the adhesive 103 is configured such that the adhesive force between the adhesive 103 and the microstructures 104 of the second optical film 102 is greater than 250 g/25 mm and the optical gain of the optical assembly 100 is greater than 1.7. In other words, the specific weight ratio of the photo-curable portion to the thermally-curable portion of the adhesive 103 can meet the adhesive force and the optical gain which are above-mentioned.

The thickness of the adhesive 103 can be 0.5~3 μm. The weight ratio of the photo-curable portion to the thermally-curable portion of the adhesive 103 and the thickness of the adhesive 103 can be further configured to improve the adhesive force between the adhesive 103 and the microstructures 104 of the second optical film 102 and the optical gain of the optical assembly 100 at the same time. In one embodiment, the thickness of the adhesive 103 can be 0.5~2 μm. In one embodiment, the thickness of the adhesive 103 can be 0.5~1.5 μm (1~1.5 μm or 0.5~1 μm). Although the thickness of the adhesive 103 is smaller (e.g. <1.5 μm), the adhesive force is large enough to avoid the separation of the adhesive 103 and the microstructures 104 of the second optical film 102. Besides, the smaller thickness of the adhesive 103 can improve the optical gain. Preferably, if wick phenomenon (between the adhesive 103 disposed on the bottom surface 101B of the first optical film 101 and the microstructures 104 of the second optical film 102) results from the combination of the photo-curable portion of the adhesive 103 and the photo-curable material of the microstructures 104 of the second optical film 102, increasing the surface area (the area not embedded in the adhesive 103) of the microstructures 104 of the second optical film 102, reducing the thickness of the adhesive 103 or any other suitable method can improve the optical gain of the optical assembly 100.

Figure 3A:
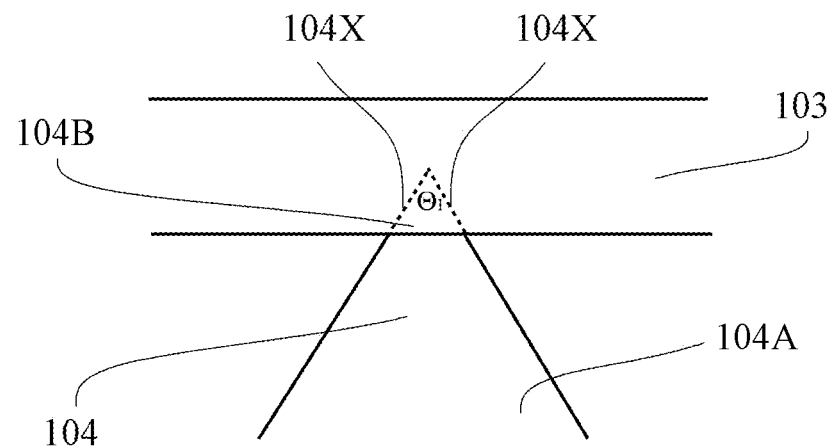
FIG. 3A illustrates a schematic cross-sectional view of a light directing portion of a microstructure.
Figure 3B:
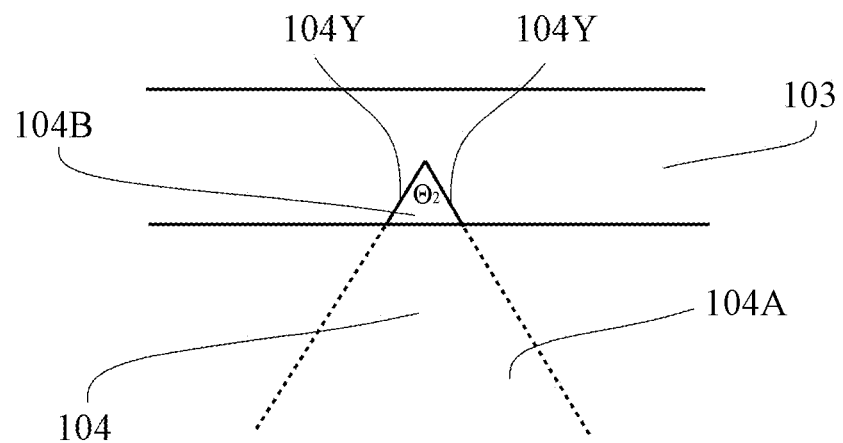
FIG. 3B illustrates a schematic cross-sectional view of a bonding portion of a microstructure.

Each microstructure 104 has a light directing portion 104A and a bonding portion 104B bonded to the adhesive 103. FIG. 3A illustrates a schematic cross-sectional view of a light directing portion 104A of a microstructure 104. FIG. 3B illustrates a schematic cross-sectional view of a bonding portion 104B of a microstructure 104. The light directing portion 104A has two intersecting extending-facets (e.g., extending-planes) 104X defining a first dihedral angle $\Theta_1$ and the bonding portion 104B has two intersecting facets (e.g., planes) 104Y defining a second dihedral angle $\Theta_2$, wherein the first dihedral angle $\Theta_1$ is substantially equal to the second dihedral angle $\Theta_2$ (in fact, the two intersecting extending-facets 104X of the light directing portion 104A is consistent with the two intersecting facets 104Y of the bonding portion 104B). Preferably, the first dihedral angle $\Theta_1$ (or the second dihedral angle $\Theta_2$) is 90 degrees; however, the present invention is not limit to this case. The microstructure 104 can extend along a first direction; in one embodiment, the microstructure 104 can be a regular microstructure having a cross-sectional shape of the same size along a first direction (e.g., regular prism or regular lens). The microstructure 104 can be a bulk microstructure (e.g., microlens). Specifically, the present invention adopts regular microstructures 104 (regular triangular prism preferably) to be boned to the adhesive 103; the microstructure 104 does not need to have special shape to increase the area contacting the adhesive 103 to increase adhesive force, so it can reduce the process complexity. Moreover, the smaller thickness of the adhesive 103 is (e.g. <1.5 μm) and regular microstructures can also reduce the total thickness of the optical assembly 100.

Figure 4:
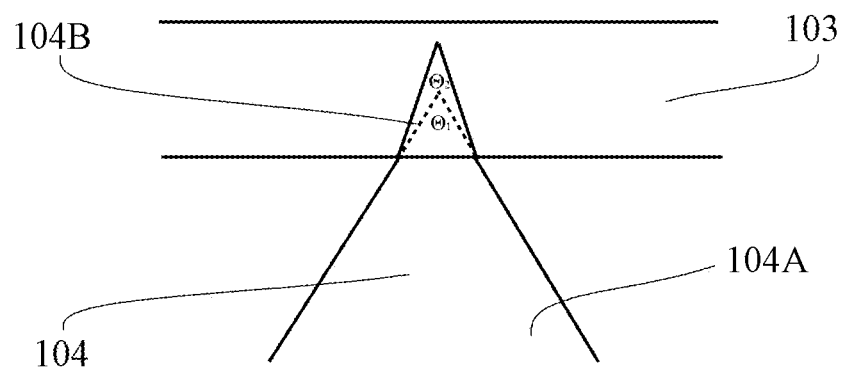
FIG. 4 illustrates a schematic cross-sectional view of a light directing portion and a bonding portion of a microstructure in another embodiment.
Figure 5:
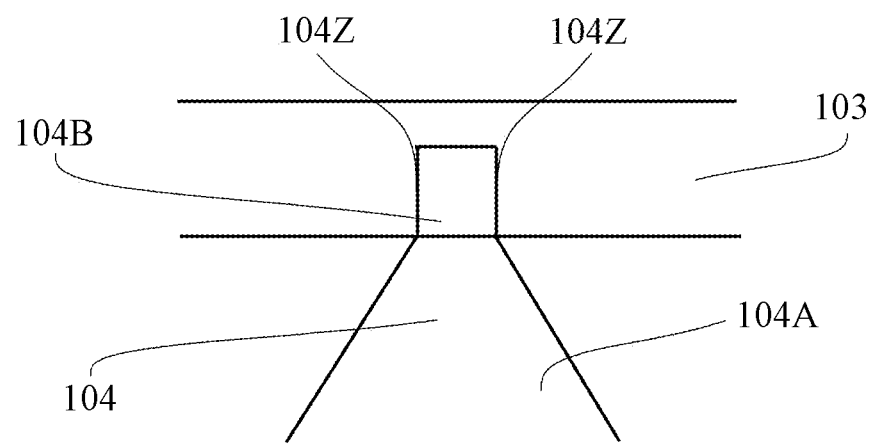
FIG. 5 illustrates a schematic cross-sectional view of a light directing portion and a bonding portion of a microstructure in another embodiment.
Figure 6A:
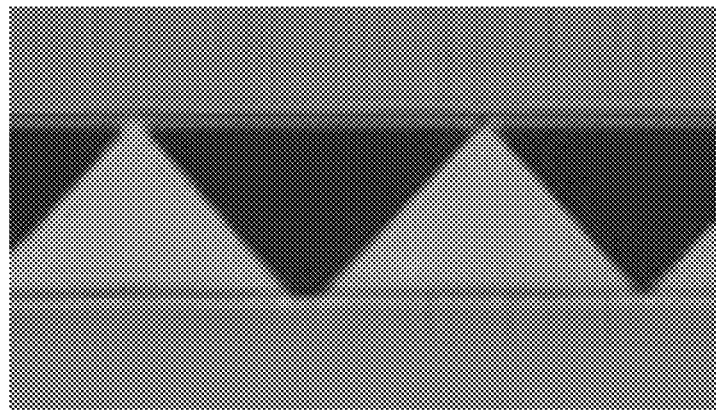
FIG. 6A to FIG. 6E illustrate actual cross-sectional views of wick phenomenon in Example 1, Example 2, Example 3, Comparative Example 1 and Comparative Example 2.
Figure 6B:
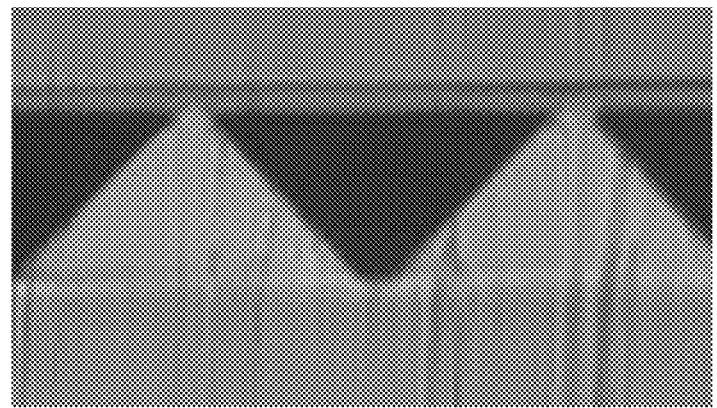
Figure 6C:
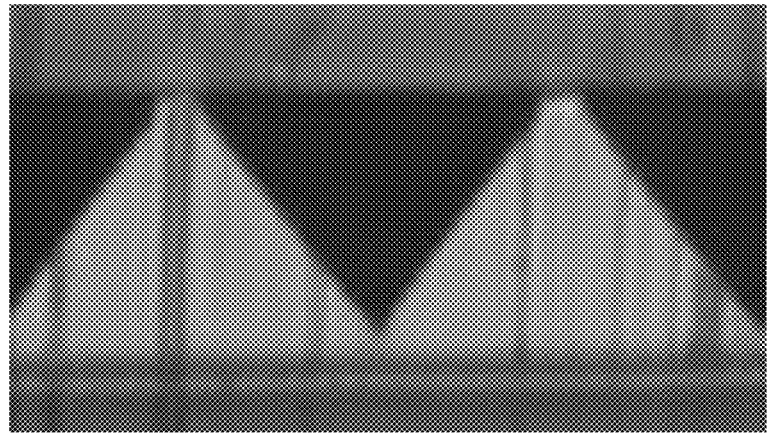
Figure 6D:
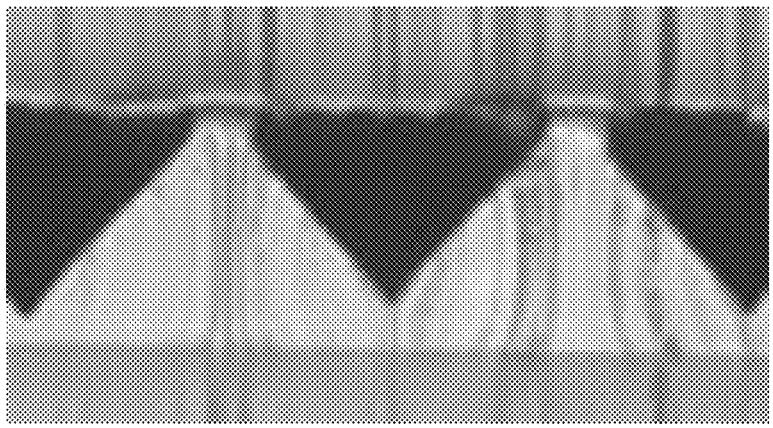
Figure 6E:
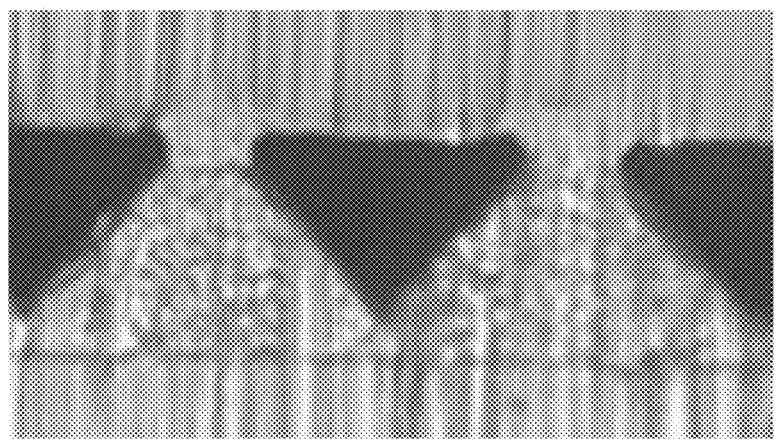

FIG. 4A illustrates a schematic cross-sectional view of a light directing portion 104A and a bonding portion 104B of a microstructure 104 in another embodiment. The second dihedral angle $\Theta_2$ can be smaller than the first dihedral angle $\Theta_1$ so that the bonding portion 104B has more area contacting the adhesive 103 to improve the adhesive force. Moreover, the bonding portion 104B can have two parallel facets (e.g., planes) 104Z so that the bonding portion 104B has more area contacting the adhesive 103 to improve the adhesive force (see FIG. 5).

The first optical film 101 can be any suitable optical film, such as light enhancement film, diffusing sheet, DBEF and so on. The second optical film 102 can be also any suitable optical film, such as light enhancement film, diffusing sheet, DBEF and so on. The first optical film 101 may comprise a substrate 101S (e.g., PET substrate) and the microstructure layer 101M disposed on the substrate 101S. The second optical film 102 may have a substrate 102S (e.g., PET substrate) and the microstructure layer 102M disposed on the substrate 102S.

The present invention can also achieve the goal of providing sufficient adhesive force between the adhesive 103 and the microstructures 104 of the second optical film 102 while maintaining the optical gain of the optical assembly 100 within operating ranges simply by selecting the appropriate weight ratio of the photo-curable portion to the thermally-curable portion of the adhesive 103 with respect to the photo-curable material of the second optical film 102 without adding other complex processes, thereby the manufacturing cost can be largely reduced.

The weight ratio of the photo-curable portion to the thermally-curable portion of the adhesive is 0.11~4. Decrease the weight ratio of the photo-curable portion to the thermally-curable portion of the adhesive 103 so that there is more thermally-curable portion which has been cured in the adhesive 103 after the heat treatment process. In other words, there is less photo-curable portion having flowability in the illumination process for bonding between the first optical film and the second optical film so as to largely reduce wick phenomenon The smaller weight ratio of the photo-curable portion to the thermally-curable portion of the adhesive 103 can contribute to the improvement of wick phenomenon; however, because the less photo-curable portion of the adhesive 103 can be bonded to the second optical film for chemical bonding, the adhesion force between the adhesive 103 and the microstructures 104 of the second optical film 102 is so weak that it is possible that the separation of the adhesive 103 and the second optical film 102 (or the microstructures 104 of the second optical film 102) often happens in the subsequent process; the greater weight ratio of the photo-curable portion to the thermally-curable portion of the adhesive 103 can worsen wick phenomenon and the optical gain of the optical assembly 100 is largely reduced (Even if the weight ratio of the thermally-curable portion of the adhesive 103 to the adhesive 103 is less than 5% (or less than 3%, or less than 1%), worse wick phenomenon can be accepted when the optical gain of the optical assembly 100 is enough for customers). Therefore, the optimal weight ratio of the photo-curable portion to the thermally-curable portion of the adhesive 103 can improve wick phenomenon and the adhesion force at the same time.

The weight ratio of the photo-curable portion to the thermally-curable portion of the adhesive 103 can be further configured to improve the adhesive force between the adhesive 103 and the microstructures 104 of the second optical film 102 and the optical gain of the optical assembly 100 at the same time. In one embodiment, the weight ratio of the photo-curable portion to the thermally-curable portion of the adhesive 103 is 0.25~2.33. In one embodiment, the weight ratio of the photo-curable portion to the first thermally-curable portion of the adhesive 103 is 0.3~1.08. Preferably, if wick phenomenon (between the adhesive 103 disposed on the bottom surface 101B of the first optical film 101 and the microstructures 104 of the second optical film 102) results from the combination of the photo-curable portion of the adhesive 103 and the photo-curable material of the microstructures 104 of the second optical film 102, increasing the surface area (the area not embedded in the adhesive 103) of the microstructures 104 of the second optical film 102, reducing the thickness of the adhesive 103 or any other suitable method can improve the optical gain of the optical assembly 100.

The weight ratio of the photo-curable portion to the thermally-curable portion of the adhesive 103 is 0.11~4 such that the adhesive force between the adhesive 103 and the microstructures 104 of the second optical film 102 is greater than 100 g/25 mm and the optical gain of the optical assembly is greater than 1.6. The present invention uses the weight ratio of the photo-curable portion to the thermally-curable portion of the adhesive 103 and the photo-curable material of the microstructures 104 of the second optical film 102 to improve the adhesive force between the adhesive 103 and the microstructures 104 of the second optical film 102 and the optical gain of the optical assembly 100 at the same time. Preferably, if wick phenomenon (between the adhesive 103 disposed on the bottom surface 101B of the first optical film 101 and the microstructures 104 of the second optical film 102) results from the combination of the photo-curable portion of the adhesive 103 and the photo-curable material of the microstructures 104 of the second optical film 102, increasing the surface area (the area not embedded in the adhesive 103) of the microstructures 104 of the second optical film 102, reducing the thickness of the adhesive 103 or any other suitable method can improve the optical gain of the optical assembly 100.

The weight ratio of the photo-curable portion to the thermally-curable portion of the adhesive 103 and the photo-curable material of the microstructures 104 of the second optical film 102 can be further configured to improve the adhesive force between the adhesive 103 and the microstructures 104 of the second optical film 102 and the optical gain of the optical assembly 100 at the same time. In one embodiment, the weight ratio of the photo-curable portion to the thermally-curable portion of the adhesive 103 is configured such that the adhesive force between the adhesive 103 and the microstructures 104 of the second optical film 102 is greater than 100 g/25 mm and the optical gain of the optical assembly 100 is greater than 1.6. In one embodiment, the weight ratio of the photo-curable portion to the thermally-curable portion of the adhesive 103 is configured such that the adhesive force between the adhesive 103 and the microstructures 104 of the second optical film 102 is greater than 120 g/25 mm and the optical gain of the optical assembly 100 is greater than 1.62. In one embodiment, the weight ratio of the photo-curable portion to the thermally-curable portion of the adhesive 103 is configured such that the adhesive force between the adhesive 103 and the microstructures 104 of the second optical film 102 is greater than 140 g/25 mm and the optical gain of the optical assembly 100 is greater than 1.62. In one embodiment, the weight ratio of the photo-curable portion to the thermally-curable portion of the adhesive 103 is configured such that the adhesive force between the adhesive 103 and the microstructures 104 of the second optical film 102 is greater than 160 g/25 mm and the optical gain of the optical assembly 100 is greater than 1.65. In one embodiment, the weight ratio of the photo-curable portion to the thermally-curable portion of the adhesive 103 is configured such that the adhesive force between the adhesive 103 and the microstructures 104 of the second optical film 102 is greater than 180 g/25 mm and the optical gain of the optical assembly 100 is greater than 1.65. In one embodiment, the weight ratio of the photo-curable portion to the thermally-curable portion of the adhesive 103 is configured such that the adhesive force between the adhesive 103 and the microstructures 104 of the second optical film 102 is greater than 200 g/25 mm and the optical gain of the optical assembly 100 is greater than 1.67. In one embodiment, the weight ratio of the photo-curable portion to the thermally-curable portion of the adhesive 103 is configured such that the adhesive force between the adhesive 103 and the microstructures 104 of the second optical film 102 is greater than 220 g/25 mm and the optical gain of the optical assembly 100 is greater than 1.67. In one embodiment, the weight ratio of the photo-curable portion to the thermally-curable portion of the adhesive 103 is configured such that the adhesive force between the adhesive 103 and the microstructures 104 of the second optical film 102 is greater than 250 g/25 mm and the optical gain of the optical assembly 100 is greater than 1.7. In other words, the specific weight ratio of the photo-curable portion to the thermally-curable portion of the adhesive 103 can meet the adhesive force and the optical gain which are above-mentioned.

The thickness of the adhesive 103 can be 0.5~3 μm. The weight ratio of the photo-curable portion to the thermally-curable portion of the adhesive 103 and the thickness of the adhesive 103 can be further configured to improve the adhesive force between the adhesive 103 and the microstructures 104 of the second optical film 102 and the optical gain of the optical assembly 100 at the same time. In one embodiment, the thickness of the adhesive 103 can be 0.5~2 μm. In one embodiment, the thickness of the adhesive 103 can be 0.5~1.5 μm (1~1.5 μm or 0.5~1 μm). Although the thickness of the adhesive 103 is smaller (e.g. <1.5 μm), the adhesive force is large enough to avoid the separation of the adhesive 103 and the microstructures 104 of the second optical film 102. Besides, the smaller thickness of the adhesive 103 can improve the optical gain. Preferably, if wick phenomenon (between the adhesive 103 disposed on the bottom surface 101B of the first optical film 101 and the microstructures 104 of the second optical film 102) results from the combination of the photo-curable portion of the adhesive 103 and the photo-curable material of the microstructures 104 of the second optical film 102, increasing the surface area (the area not embedded in the adhesive 103) of the microstructures 104 of the second optical film 102, reducing the thickness of the adhesive 103 or any other suitable method can improve the optical gain of the optical assembly 100.

Experiments

The following examples take a test of "the weight ratio of the photo-curable portion to the thermally-curable portion of the adhesive" vs "the photo-curable material of the prisms of the second optical film". However, the present invention is not limited to these examples. In these examples, the photo-curable material of the prisms 104 of the second optical film 102 are the same, the thermally-curable portion of the adhesive 103 is made of combination of EM-2000 (manufactured by Negami chemical industrial Company) and SN-50 (manufactured by Negami chemical industrial Company), and the photo-curable portion of the adhesive 103 is made of Bisphenol A (EO)$_{30}$ Dimethacrylate (M2301, manufactured by Miwon Company) and Isodecyl Acrylate (M130, manufactured by Miwon Company). Moreover, photoinitiator 184 is added in each example. After four hours of stirring at normal temperature, proceed to coating, preparing and manufacturing of sample and physical measurement. The measurement result is list in Table 1 and FIG. 6A to FIG. 6E illustrate real cross-sectional views in Example 1, Example 2, Example 3, Comparative Example 1 and Comparative Example 2.

TABLE 1

|  | Example 1 | Example 2 | Example 3 | Comparative Example 1 | Comparative Example 2 |
| --- | --- | --- | --- | --- | --- |
| the weight ratio of the photo-curable portion to the thermally-curable portion of the adhesive | 0 | 0.33 | 1 | 3 | ∞ |
| the thickness of the adhesive (μm) | 1~1.5 | 1~1.5 | 1~1.5 | 1~1.5 | 1~1.5 |
| optical gain (brightness) | 1.67 | 1.66 | 1.64 | 1.60 | 1.55 |

TABLE 1-continued

|  | Example 1 | Example 2 | Example 3 | Comparative Example 1 | Comparative Example 2 |
|---|---|---|---|---|---|
| adhesive force (g/25 mm) | 117 | 202 | 231 | 233 | 238 |
| wick phenomenon | none | none | slight | worse | the worst |

EXAMPLE 1

The material of the adhesive 103 in Example 1 is all thermal-curable. Coat the adhesive 103 on the bottom surface 101B of the first optical film 101 and heat the adhesive 103 to dry the solvent of the adhesive 103 such that the adhesive 103 proceeds to a thermal-curable reaction. Because the adhesive 103 is in the solid state after the thermal-curable reaction, the adhesive 103 can not flow in the adhesive process so as to completely overcome wick phenomenon. Control the thickness of the adhesive 103 to 1~1.5 µm, bond the prisms 104 of the second optical film 102 to the adhesive 103 by embossing of the roll such that the adhesive 103 and the prisms 104 of the second optical film 102 are physically bonded. The optical gain is 1.67. Because the adhesive 103 is all made of the thermal-curable material, the prisms 104 of the second optical film 102 are bonded only by physical bonding (no chemical bonding). Therefore, the adhesive force is relative low, merely about 117 g/25 mm, as shown in Table 1.

EXAMPLE 2

The weight ratio of the photo-curable portion to the thermally-curable portion of the adhesive 103 in Example 2 is 0.33. Coat the adhesive 103 on the bottom surface 101B of the first optical film 101 and heat the adhesive 103 to dry the solvent of the adhesive 103 such that the thermal-curable portion of the adhesive 103 proceeds to a thermal-curable reaction. Control the thickness of the adhesive 103 to 1~1.5 µm, bond the prisms 104 of the second optical film 102 to the adhesive 103 by embossing of the roll such that the adhesive 103 and the prisms 104 of the second optical film 102 are physically bonded. Because the weight ratio 0.67 of the thermal-curable portion to the photo-curable portion of the adhesive 103 is greater, the adhesive 103 is dried to be in the semi-solid state and the adhesive 103 can not flow in the adhesive process so as to completely overcome wick phenomenon. Moreover, the photo-curable portion of the adhesive 103 and the prisms 104 of the second optical film 102 can proceed to a crosslink-curable reaction by UV illumination process to form chemical bonding. Therefore, the adhesive force can be improved to be 202 g/25 mm and the optical gain is 1.66, as shown in Table 1.

EXAMPLE 3

The weight ratio of the photo-curable portion to the thermally-curable portion of the adhesive 103 in Example 3 is 1. Coat the adhesive 103 on the bottom surface 101B of the second optical film 102 and heat the adhesive 103 to dry the solvent of the adhesive 103 such that the thermal-curable portion of the adhesive 103 proceeds to a thermal-curable reaction. Control the thickness of the adhesive 103 to 1~1.5 µm, bond the prisms 104 of the second optical film 102 to the adhesive 103 by embossing of the roll such that the adhesive 103 and the prisms 104 of the second optical film 102 are physically bonded. Because the adhesive 103 has the weight ratio 1 of the thermal-curable portion to the photo-curable portion, the adhesive 103 is dried to be still in the semi-solid state and the adhesive 103 can not easily flow in the adhesive process so as to still completely overcome wick phenomenon. Moreover, the photo-curable portion of the adhesive 103 and the prisms 104 of the second optical film 102 can proceed to a crosslink-curable reaction by UV illumination process to form chemical bonding. Therefore, the adhesive force can be improved to be 231 g/25 mm. However, slight wick phenomenon occurs so that the optical gain is relative low, 1.64, as shown in Table 1.

COMPARATIVE EXAMPLE 1

The weight ratio of the photo-curable portion to the thermally-curable portion of the adhesive 103 in Comparative Example 1 is 3. Coat the adhesive 103 on the bottom surface 101B of the second optical film 102 and heat the adhesive 103 to dry the solvent of the adhesive 103 such that the thermal-curable portion of the adhesive 103 proceeds to a thermal-curable reaction. Control the thickness of the adhesive 103 to 1~1.5 µm, bond the prisms 104 of the second optical film 102 to the adhesive 103 by embossing of the roll such that the adhesive 103 and the prisms 104 of the second optical film 102 are physically bonded. The photo-curable portion of the adhesive 103 and the prisms 104 of the second optical film 102 can proceed to a crosslink-curable reaction by UV illumination process to form chemical bonding. Therefore, the adhesive force can be improved to be 233 g/25 mm. Because the adhesive 103 only has the weight ratio 0.33 of the thermal-curable portion to the photo-curable portion, the adhesive 103 still has flowability after drying and thermal curing so as to not completely overcome wick phenomenon. Therefore, the optical gain is relative low, 1.60, as shown in Table 1.

COMPARATIVE EXAMPLE 2

The material of the adhesive 103 in Example 1 is all photo-curable. Coat the adhesive 103 on the bottom surface 101B of the second optical film 102 and heat the adhesive 103 to dry the solvent of the adhesive 103. Control the thickness of the adhesive 103 to 1~1.5 µm, bond the prisms 104 of the second optical film 102 to the adhesive 103 by embossing of the roll. The photo-curable material of the adhesive 103 and the prisms 104 of the second optical film 102 can proceed to a crosslink-curable reaction by UV illumination process to form chemical bonding. Because the adhesive 103 is all made of the photo-curable material, the adhesive 103 has flowability after drying and thermal curing and the worst wick phenomenon occurs. Therefore, although the adhesive force can be increased to be 238 g/25 mm, the optical gain is relative lower, merely about 1.55, as shown in Table 1.

In one embodiment, the above manufacturing method can be correspondingly modified to apply to the optical assembly comprising: a first optical film having a first surface; an adhesive disposed on the first surface of the first optical film, wherein the adhesive comprises a thermally-curable portion and a photo-curable portion; and a second optical film comprising a thermally-curable material bonded to the thermally-curable portion of the adhesive, wherein the thermally-curable portion of the adhesive is being bonded to the thermally-curable material of the second optical film when the thermally-curable portion of the adhesive is being cured and the photo-curable portion of the adhesive has been cured. Therefore, it does not be further described herein.

The above disclosure is related to the detailed technical contents and inventive features thereof. People skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method of forming an optical assembly, comprising:
providing a first optical film having a first surface and a second optical film comprising a photo-curable material;
disposing an adhesive on the first surface of the first optical film, wherein the adhesive comprises a photo-curable portion and a thermally-curable portion mixed with the photo-curable portion;
performing a heat-treatment process on the adhesive to cure the thermally-curable portion of the adhesive; and
bonding the adhesive to the second optical film through the bonding between the photo-curable portion of the adhesive and the photo-curable material of the second optical film without relying on the bonding between the thermally-curable portion of the adhesive and the photo-curable material of the second optical film.

2. The method according to claim 1, wherein the weight ratio of the thermally-curable portion of the adhesive to the adhesive is less than 5%.

3. The method according to claim 1, wherein the weight ratio of the thermally-curable portion of the adhesive to the adhesive is less than 3%.

4. The method according to claim 1, wherein the weight ratio of the thermally-curable portion of the adhesive to the adhesive is less than 1%.

5. A method of forming an optical assembly, comprising:
providing a first optical film having a first surface and a second optical film comprising a photo-curable material;
disposing an adhesive on the first surface of the first optical film, wherein the adhesive comprises a photo-curable portion;
performing a heat-treatment process on the adhesive to remove a solvent in the adhesive; and
bonding the adhesive to the second optical film through the bonding between the photo-curable portion of the adhesive and the photo-curable material of the second optical film.

6. The method according to claim 5, wherein after performing the heat-treatment process on the adhesive to remove the solvent in the adhesive, the adhesive is not in a solid state.

7. The method according to claim 6, wherein bonding the adhesive to the second optical film through the bonding between the photo-curable portion of the adhesive and the photo-curable material of the second optical film is after performing the heat-treatment process on the adhesive to remove the solvent in the adhesive.

* * * * *